United States Patent

[11] 3,628,169

[72] Inventor Sung Pal Chur
San Jose, Calif.
[21] Appl. No. 15,402
[22] Filed Mar. 2, 1970
[45] Patented Dec. 14, 1971
[73] Assignee Caelus Memories, Inc.

[54] DIGITAL DATA DISCRIMINATOR SYSTEM

4 Claims, 3 Drawing Figs.

[52] U.S. Cl. 331/1 A, 331/18, 331/25, 328/63, 328/72
[51] Int. Cl. H03b 3/06
[50] Field of Search 331/1 A, 25, 18, 27; 328/63, 72

[56] References Cited

UNITED STATES PATENTS

| | | | |
|---|---|---|---|
| 2,935,609 | 5/1960 | Rabin et al. | 331/25 |
| 3,333,205 | 7/1967 | Featerston | 331/1 A |
| 3,405,369 | 10/1968 | Couvillon | 331/1 A |
| 3,407,361 | 10/1968 | Galopin | 331/25 |

*Primary Examiner*—John Kominski
*Attorney*—Lindenberg, Frelich & Wasserman

ABSTRACT: A discriminator system is disclosed for qualifying (clocking) digital data signals of inconsistent frequency (phase) by controlling a clock pulse oscillator with the data signal. A signal-controlled oscillator provides clocking pulses and additionally controls the system to provide first and second interrelated test pulses defining test intervals. Phase variations (as resulting from a change in the data signal) are detected by a shift in the time relationship between the pulses of the data signal and the test pulses. The individual test pulses are tested in coincidence with the data signal to provide two distinct coincidence periods, the comparative durations of which indicates any requisite correction. Opposed-polarity signals are supplied to control the oscillator, during the separate coincidence periods thereby affording an integrated signal level for stabilizing the oscillator to generate the clock pulses in phase-locked synchronization with the data signal.

Patented Dec. 14, 1971 3,628,169

INVENTOR.
SUNG PAL CHUR
BY
Nilsson, Robbins, Wills & Berliner
Attorneys.

DIGITAL DATA DISCRIMINATOR SYSTEM

BACKGROUND AND SUMMARY OF THE INVENTION

One form of digital signal representation which is in widespread use involves trains of pulses spaced apart on a time base to represent binary values. In prior systems utilizing such representation, it has been somewhat conventional to define critical locations on the time base with "clock" pulses so that the presence of a pulse at such a location indicates a "one" while the absence of a pulse at such a location indicates a "-zero." In some prior systems, an independent and separate channel has been provided for clock pulses; however, various systems have also been proposed for developing clock signals from the data signal. The present system is of the latter class.

One of the problems encountered in "clocking" or timing the pulses developed in digital data systems involves phase or frequency changes that may occur in the data-pulse train or signals. For example, motors and other equipment for driving a magnetic recording medium may vary in speed and produce a change in the magnetic surface velocity. As a consequence, the frequency (phase) of the data signal may vary to a substantial extent. Of course, such changes are unpredictable and are difficult to compensate or control. Furthermore, individual systems utilizing different interchangeable data records (tapes, disks, and so on) may operate at slightly differing speeds, again presenting the need for clock signals of variable phase to accommodate changes in the data signal. Thus, a substantial need exists for an economical and effective system to provide data-controlled clock pulses, usable with as few as a single data signal, which system will accommodate variations in that signal.

In general, the system of the present invention provides clock pulses from a signal-controlled oscillator, the phase of which is controlled by the level of a stored control signal. The control signal is registered as an analog quantity and is varied to preserve phase-lock synchronization, under the control of opposed-polarity signals that result from an indirect comparative relationship of the clock pulses to the incoming data signals. Specifically, the clock pulses are utilized to define two similar, sequential test intervals which under the condition of idealized synchronization split or divide the data pulses into two equal portions. The coincident portion of each data pulse with each of the two separate intervals then provides a comparative relationship between the clock pulses and the data pulses, which information is utilized to vary the control signal for preserving lock-phase relationship between the data signal and the clock pulses.

BRIEF DESCRIPTION OF THE DRAWINGS

In the drawings, which constitute a part of this specification, an exemplary embodiment demonstrating various objectives and features hereof is set forth, specifically.

DESCRIPTION OF THE ILLUSTRATIVE EMBODIMENT as required, a detailed illustrative embodiment of the invention is disclosed herein. The embodiment exemplifies the invention which may, of course, be constructed in various other forms, some of which may be radically different from the illustrative embodiment. However, the specific structural and functional details disclosed herein are representative and they provide a basis for the claims herein which define the scope of the present invention.

Figure 1:
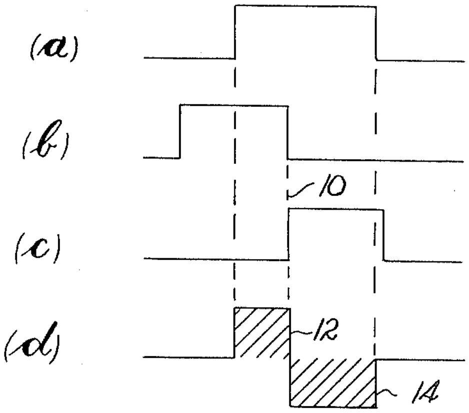
FIG. 1 is a diagram illustrative of somewhat idealized waveforms illustrative of the operation of an embodiment of the present invention.

Referring initially to FIG. 1, for a preliminary understanding of the concepts involved herein, four separate curves, FIGS. 1 (*a*), 1(*b*), 1(*c*) and 1 (*d*) are shown. The curve of FIG. 1(*a*) is representative of a single pulse in a data signal or pulse train, e.g., manifesting a binary digital "one." The curves of FIGS. 1(*b*) and 1(*c*) define test time intervals which are precisely sequential. That is, at an instant (indicated by line 10) the trailing edge of the pulse of FIG. 1(*b*) coincides to the leading edge of the pulse of FIG. 1(*c*).

In the operation of the system hereof the instant represented by the line 10 is variously shifted on a time base to seek the center of the data pulses as represented by the curve of FIG. 1(*a*). Specifically, the first interval defined by the pulse of FIG. 1(*b*) is tested in coincidence with the data pulse [FIG. 1(*a* )] to develop first coincidence interval represented by a pulse 12 as shown in the curve of FIG. 1 (*d*). Somewhat similarly, the interval of the second pulse [FIG. 1(*c*)] is tested in coincidence with the data pulse [FIG. 1(*a*)] to develop a second coincidence period indicated by the pulse 14 in the curve of FIG. 1(*d*). The system operates to seek a state whereby the pulses 12 and 14 [FIG. 1(*d*)] are of identical duration. The clock pulses, developed in the system, are precisely related to the instant indicated by the line 10, therefore as that instant varies in time, so also the clock pulses to preserve phase lock synchronization with the data pulses [FIG. 1(*a*)]. Specifically, if the coincidence periods of the pulses 12 and 14 differ, such difference indicates the necessary correction to seek the desired phase relationship between the data signal and the instant designated by the line 10, which is related to the clock pulses. The opposed-polarity pulses 12 and 14 are essentially integrated or smoothed to provide a quantitative adjustment for controlling an oscillator to preserve phase lock between the data signal and the clock pulses.

Figure 2:
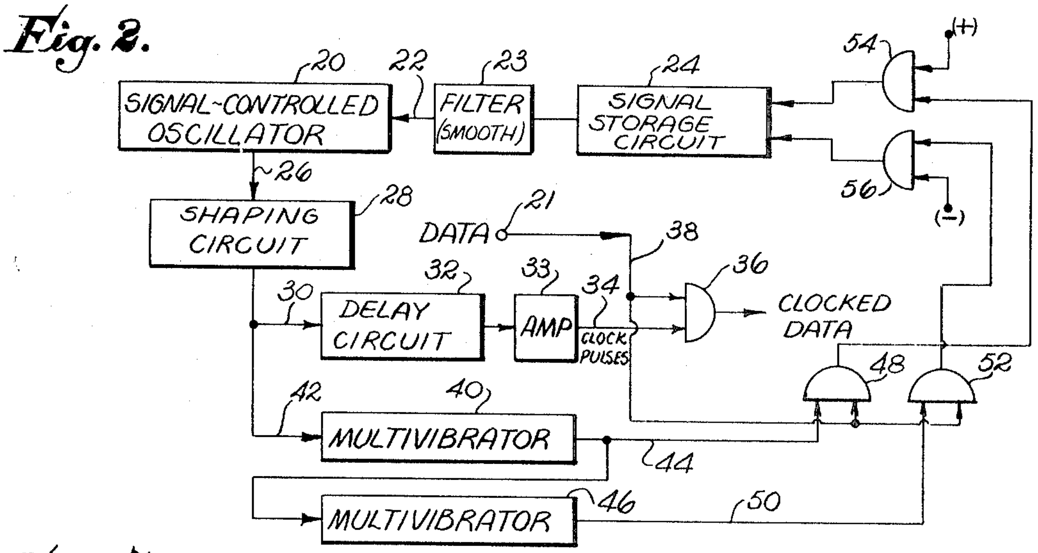
FIG. 2 is a block diagram of an apparatus incorporating the principles of the present invention.

Referring now to FIG. 2, there is shown a system hereof wherein a variable frequency oscillator 20 is controlled to produce clock pulses that are phase locked to a data signal that is received at a terminal 21. The data signal comprises binary pulses as considered above. Frequency or phase variations in the output of the oscillator 20 are controlled by a signal received through a conductor 22 and a filter 23 (smoothing circuit) from a signal storage circuit 24. The oscillator 20 along with the filter 23 and the signal storage circuit 24 may take a wide variety of different forms as well known and widely employed in various phase-loop systems. Some such circuits along with broad operational aspects thereof are disclosed in detail in a book entitled "Phase Lock Techniques" by Floyd M. Gardner, published in 1966 by J. Wylie & Sons, Inc. Specifically, for example, the signal storage circuit 24 may comprise a capacitor for storing a signal level and providing a buffered output by means of a cathode-follower configuration as well known in the prior art. The filter circuit 23 is a low-pass smoothing unit and may include a sample-and-hold circuit as well known in the art. Functionally, the filter circuit 23 removes sharp fluctuations and supplies a smooth signal from the storage circuit 24 to the signal-controlled oscillator 20.

The sinusoidal output from the signal-controlled oscillator is applied to a shaping circuit 28 which may comprise a binary-output trigger, e.g., threshold device, and which converts a sinusoidal output to a series of substantially rectangular pulses.

The output from the shaping circuit 28 consists of a train of substantially similar pulses and is applied through a conductor 30 through a delay circuit 32 to an amplifier 33 to provide clock pulses in a conductor 34. Of course in any system, clocking may occur at several points however, illustrative of such clocking, in the system as disclosed herein, clock pulses are applied to an AND-gate 36 along with the data signal received from the terminal 21 through the conductor 38. Thus, the output from the gate 36 is the clocked data, i.e., the synchronized binary digit-representing pulses.

In considering the preservation of phase lock between the clock pulses in conductor 34 and the data pulses in conductor 38, note that the regular pulses provided from the shaping circuit 28 are also applied to a monostable multivibrator 40 through a conductor 42. When actuated by a received pulse, the multivibrator 40 provides a precisely timed first test pulse to an output conductor 44, which test pulse is supplied to a somewhat similar multivibrator 46 and to an AND-gate 48. The multivibrator 46 is triggered by the trailing edge of the test pulse from the multivibrator 40 and thereupon provides a second test pulse to a conductor 50. The test pulses from the multivibrators 40 and 46 are represented in FIGS. 1(*b*) and 1(*c*) as previously discussed in detail and define substantially equal test periods.

The output from the multivibrator 46 is supplied through a conductor 50 to an AND-gate 52. Both of the AND-gate 48 and 52 are connected to receive the data signal through the conductor 38. Thus, the gates 48 and 50 "test" the data signal under control of the test pulses from the multivibrators 40 and 46 to provide coincidence pulses which define intervals of coincidence of the data pulses and the test intervals. Specifically, the gates 48 and 52 are qualified by the multivibrators 40 and 46 respectively for two distinctly separate time intervals to test the coincidence periods of those two intervals with each data pulse received through the conductor 38. During the two distinct coincidence periods as represented by coincidence pulses 12 and 14 (FIG. 1 (*d*)), AND-gates 54 and 56 are qualified in sequence to supply signals of opposed polarity to adjust the level of the control signal stored by the circuit 24.

Figure 3:
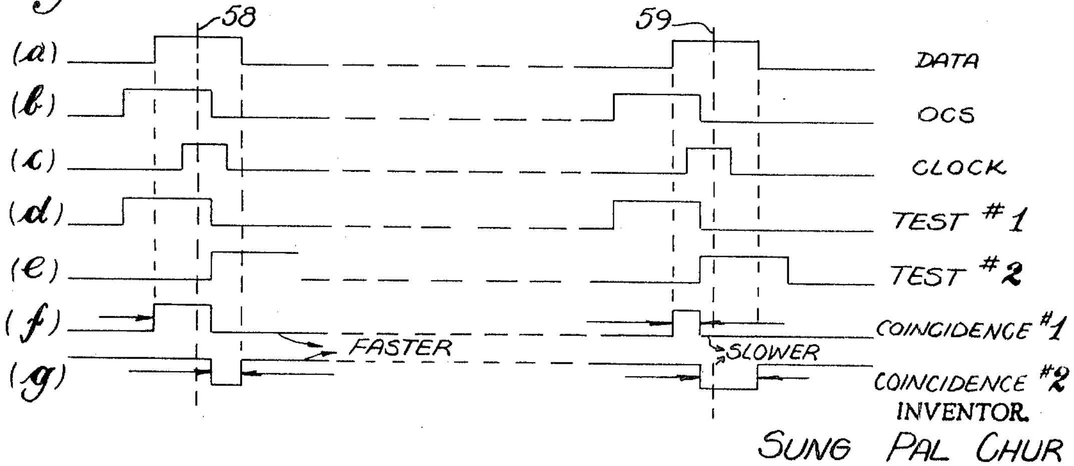
FIG. 3 is a diagrammatic presentation of somewhat idealized waveforms developed in the system of FIG. 2.

In view of the above preliminary description of the exemplary embodiment, a consideration of the system of FIG. 2 will complete an appreciation of the system. The data signal (comprising binary pulses) which may be derived from a magnetic record, or the like is provided to the conductor 38. That is, the data signal is binary and in that sense may be considered a train of spaced-apart pulses provided to represent a digital value as shown in the curve of FIG. 3(*c*). As shown by that curve the lines 58 and 59 coincide substantially with the centers of the data-pulse locations. The presence or absence of a pulse at such instants manifests a binary "one" or "zero." In order to formulate the data signal into a more precise form, and eliminate spurious components, as indicated above, it has been common practice to clock the data signal by enabling only a central portion of the data signal to pass through a gate. Accordingly, as shown by the curve in FIG. 3(*c*), clock pulses are provided to clock the received data signal through the gate 36 (FIG. 2). That is, relating the above considerations to the structure of FIG. 2, the data signal, [represented by the waveform of FIG. 3(*a*)] and the clock pulses [represented by the waveform of FIG. 3(*c*)] are applied to the AND-gate 36 to provide a clocked data output.

The development of the clock pulses, as represented by the waveform of FIG. 3(*c*) involves initially forming pulses as shown in the waveform of FIG. 3(*b*) by shaping and clipping the output of the signal controlled oscillator 20 (FIG. 2). That is, the output from the oscillator 20 is applied to the shaping circuit 28 to provide the pulses as shown in the waveform of FIG. 3(*b*). Further processing of these pulses by the delay circuit 32 and the amplifier 33 provides the clock pulses substantially as depicted in the waveform of FIG. 3(*c*). It is to be noted that the delay circuit 32 involves approximately ½-bit shift to substantially center the clock pulses within the data pulses.

The pulses, as depicted in curve of FIG. 3(*b*) from the shaping circuit 28 are also applied to the multivibrator 40 through the conductor 42 in order to provide a series of first test pulses substantially as depicted in the curve of FIG. 3(*d*). These test pulses define a first test interval, the termination of which initiates a second test interval as defined by the second test pulses, depicted in the curve of FIG. 3(*e*). As a consequence, the pulses provided from the multivibrators 40 and 46 are sequential, the trailing edges of pulses from the multivibrator 40 coinciding to the leading edges of pulses from the multivibrator 46. These test pulses as indicated above, are applied to the AND-gates 48 and 52 respectively, for a test of coincidence with the data pulses [FIG. 3(*a*)].

The timing relationship which the system seeks to accomplish places the clock pulses [FIG. 3(*c*)] at the center of the data pulses [FIG. 3(*a*)]. Under such an idealized timing relationship, the trailing edge of a first set pulse (and the leading edge of a second test pulse) equally divides the data pulse producing equal coincidence intervals during which the AND-gates 48 and 52 are qualified. Consequently, the coincidence interval during which the gate 48 is qualified is identical to the period during which the AND-gate 52 is qualified. During the first period of coincidence, the AND-gate 54 is qualified to supply a positive signal to vary the signal level registered by the storage circuit 24. The second interval involves the qualification of the AND-gate 56 during which a negative signal is supplied to the signal storage circuit. As the amplitudes of the positive and negative signals applied to the gates 54 and 56 respectively are identical, the similar coincidence intervals during which these gates are qualified produces no net change in the signal level stored by the circuit 24. The filter 23 smooths the instantaneous variations in the signal level registered by the storage circuit 24 so as to avoid rapid fluctuations in the oscillator 20. As a consequence, the output from the oscillator 20 remains unchanged and the frequency or phase of the oscillator 20 holds in relation to the data pulses.

The above example assumed the system to be in perfect phase synchronization; however, assume now that the phase of the data signal received in the conductor 38 advances as a result of an increase in the velocity of a magnetic storage surface. This change has the effect of compressing the time base between the data pulses as represented by the waveform of FIG. 3(*a*). As a result, it is desirable to increase the frequency of the oscillator 20 to maintain and preserve phase-lock synchronization. The increased frequency of the data signal causes the centerline of the data pulses to be displaced to the left as indicated by the line 58 in FIG. 3. As a result, the clock pulses [FIG. 3(*c*)] trail the centerline 58 and the centerline precedes the trailing edge of the first test pulses [FIG. 3(*d*)]. As a result, the coincidence of the first test pulse with the data pulse is of longer duration than that of the second test pulse. Therefore, as indicated in the curve of FIG. 3(*f*) the gate 54 is qualified for a duration greater than the duration of qualification for the gate 56 as represented in the curve of FIG. 3(*g*). The net difference between these two intervals of qualification is to provide a positive-going increase in the signal level stored in the circuit 24. As a result, the oscillator 20 is controlled to advance in phase, i.e., increase in frequency.

In the event that a situation reverse to that described above should occur, or the system should over control so that the frequency of the oscillator 20 lags the data pulses, the centerline 59 of the data pulses as shown in FIG. 3 shifts to the right of the test pulses with the result that the second coincidence period (defined by the test pulses) becomes greater than the first coincidence period. As a consequence, of the second coincidence period being longer than the first, the gate 56 is qualified to pass a negative signal for an interval which is greater than the interval during which the gate 54 is qualified to pass a positive signal. This comparative situation is illustrated about the line 59 in the curves of FIG. 3(*f*) and 3(*g*), depicting the situation which commands the signal controlled oscillator to reduce its speed. It is to be noted that, as corrections to preserve phase lock are made only during data pulses, the lack of data pulses merely preserves the frequency of the clock pulses at the instant rate. Thus, the system utilizes all of the timing information carried by the data signal.

In the operation of the system it is apparent that various relationships may be established between the first test interval (defined by the multivibrator 40) and the second test interval (defined by the multivibrator 46) providing such relationships are adjusted by the amplitudes of signal levels applied through the gates 54 and 56. In this regard, it is to be understood that the system hereof may take many different forms wherein two separate intervals are defined in accordance with the phase of a clock oscillator and which intervals are then coincidence tested with a data signal to develop an integrated control signal for the oscillator. As various modifications and deviations will be apparent and in accordance with established precedents, the scope hereof shall be interpreted in accordance with the claims as set forth below.

What is claimed is:

1. A digital discriminator for providing clock signals for data pulses, each pulse having a fixed period from a pulse leading edge to a pulse trailing edge, in a received digital signal, comprising:

a signal-controlled oscillator for generating said clock signals;

a signal storage means for registering a signal level to control the frequency of said oscillator;

means connected to be controlled by said oscillator for defining first and second time intervals of consistent relative duration which is related to said fixed period; and means for gating a positive polarity signal to said signal storage means during the period that said first time interval coincides with a data pulse from the pulse leading edges thereof and gating a negative polarity signal to said signal storage means during the period said second time interval coincides with a data pulse, until the pulse trailing edges thereof, whereby the gated values of said negative and positive polarity signals are integrated at said storage means to control said signal-controlled oscillator.

2. A system according to claim 1 wherein said first and second time intervals are substantially equal to the fixed period of each data pulse and are defined by sequential pulse trains.

3. A system according to claim 2 further including a delay circuit for delaying the output of said signal controlled oscillator by substantially half said fixed period, and an AND gate for producing outputs as a function of said data pulses and the outputs of said delay circuit.

4. A system according to claim 2 wherein said means for defining said first and second time intervals comprises a first pulse generator connected to be triggered by said oscillator and a second pulse generator connected to be triggered by said first pulse generator each of said generators providing pulses having durations substantially equal to said fixed period, further including a delay circuit for delaying the output of said signal-controlled oscillator by substantially half said fixed period, and an AND gate for producing outputs as a function of said data pulses and the outputs of said delay circuit.

* * * * *